United States Patent [19]
Noguchi

[11] Patent Number: 5,062,461
[45] Date of Patent: Nov. 5, 1991

[54] PNEUMATIC TIRE HAVING A TREAD PATTERN FOR REDUCING NOISE

[75] Inventor: Makoto Noguchi, Hiratsuka, Japan

[73] Assignee: The Yokohama Rubber Co., Ltd., Tokyo, Japan

[21] Appl. No.: 543,014

[22] Filed: Jun. 25, 1990

[30] Foreign Application Priority Data

Jun. 30, 1989 [JP] Japan .................................. 1-166738

[51] Int. Cl.⁵ .............................................. B60C 11/03
[52] U.S. Cl. ................................................ 152/209 R
[58] Field of Search .......... 152/209 R, 209 A, 209 D, 152/209 B

[56] References Cited

U.S. PATENT DOCUMENTS

| | | | |
|---|---|---|---|
| 2,878,852 | 3/1959 | Lippmann et al. | 152/209 R |
| 4,327,792 | 5/1982 | Landers | 152/209 R |
| 4,474,223 | 10/1984 | Landers | 152/209 R |
| 4,777,993 | 10/1988 | Yamashita et al. | 152/209 R |

FOREIGN PATENT DOCUMENTS 268436  5/1988  European Pat. Off. ......... 152/209 R

*Primary Examiner*—Geoffrey L. Knable
*Attorney, Agent, or Firm*—Armstrong, Nikaido, Marmelstein, Kubovcik & Murray

[57] ABSTRACT

In a tire equipped on the tread thereof with a tread pattern consisting of a plurality of kinds of pitches having different pitch lengths and arranged repeatedly, a pneumatic tire characterized in that said pitches having different pitch lengths, which are to be disposed inside the length of one circumference of said tread, are at least four kinds, the number of pitches having the shortest pitch length is one or two, and the pitch ratio $\alpha$ of the greatest pitch length Pmax to the smallest pitch length Pmin (Pmax/Pmin) is from 1.40 to 1.55; and that the total number of the fundamental periods, each of which is defined as a period from the pitch having the greatest pitch length to a pitch immediately before the next pitch having the greatest pitch length and which is to be disposed inside one circumference of said tread, is at least 6, and the period length ratio $\beta$ (Tmax/Tmin) of the greatest period length Tmax to the smallest period length Tmin is from 1.20 to 1.80.

2 Claims, 4 Drawing Sheets

PNEUMATIC TIRE HAVING A TREAD PATTERN FOR REDUCING NOISE

BACKGROUND OF THE INVENTION

This invention relates to a pneumatic tire equipped on its tread surface with a tread pattern for reducing sounds, particularly noise, generated with rolling of the tire.

Conventionally, the noise generated with rolling of the tire includes so-called "rustling feel" which is offensive and has an aurally and psycologically unpleasant tone (hereinafter referred to as "rustling feel"), besides the pitch noise resulting from the tread pattern.

With upgrading of vehicles such as passenger cars, the requirement for reduction of noise resulting from rolling of the tire has become severer and severer recently. In other words, the reduction of not only the pitch noise described above but also rustling feel has strongly been required as the noise reduction measure of the tire.

A pitch variation method is known as the method of reducing the pitch noise among the noises described above as explained in detail in U.S. Pat. Specifications Nos. 4,327,792 and 4,474,223. In a tread pattern consisting of the repeating design cycles of a plurality of pitches having different lengths, this method disperses the peaks of the harmonics numbers having the total pitch number in one circumferential length of the tread as the primary order by frequency modulation and converts the noise to white noise. Here, the term "harmonics number" means the number of times of occurrence of vibration per rotation of the tire. If the total pitch number per one circumferential length of the tread of the tire is 64, for example, vibration occurs 64 times. Therefore, the harmonics number at this time is 64. However, when the peaks of the harmonics number are dispersed by the pitch variation method, roughness becomes remarkably greater with a higher degree of dispersibility.

This roughness is typical characteristics which increase the rustling feel described above. Therefore, the pitch variation method involves the problem in that the more it reduces the pitch noise, the greater becomes the rustling feel.

Another problem lies in that if the pitch length and number of the pitches disposed on the tread are changed at random, adverse influences are exerted on tire performance such as maneuvering stability and comfort to drive of the tire.

SUMMARY OF THE INVENTION

It is an object of the present invention to provide a pneumatic tire having a tread pattern which reduces the pitch noise occurring during rolling of the tire without lowering tire performance such as maneuvering stability and driving comfort and at the same time, reduces aurally and psychologically offensive rustling feel.

The present invention is based on the finding that in the pitch variation method described above, roughness depends not only on dispersibility of the peaks of the harmonics number but also on the modulation frequency as shown in FIG. 2 and attains the peaks at specific frequencies.

In a tire equipped on the tread thereof with a tread pattern consisting of a plurality of kinds of pitches having different pitch lengths and arranged repeatedly, the present invention provides a pneumatic tire which is characterized in that: the pitches having different pitch lengths, which are to be disposed inside the length of one circumference of the tread, are at least four kinds, the number of pitches having the shortest pitch length is one or two, and the pitch ratio of the greatest pitch length Pmax to the smallest pitch length Pmin (Pmax/Pmin) is from 1.40 to 1.55; and the total number of the fundamental periods, each of which is defined as a period from the pitch having the greatest pitch length to a pitch immediately before the next pitch having the greatest pitch and which is to be disposed inside one circumference of the tread, is at least 6, and the period length ratio $\beta$ (Tmax/Tmin) of the greatest period length Tmax to the smallest period length Tmin is from 1.20 to 1.80.

DETAILED DESCRIPTION OF THE PREFERRED EMBODIMENTS

Figure 1:
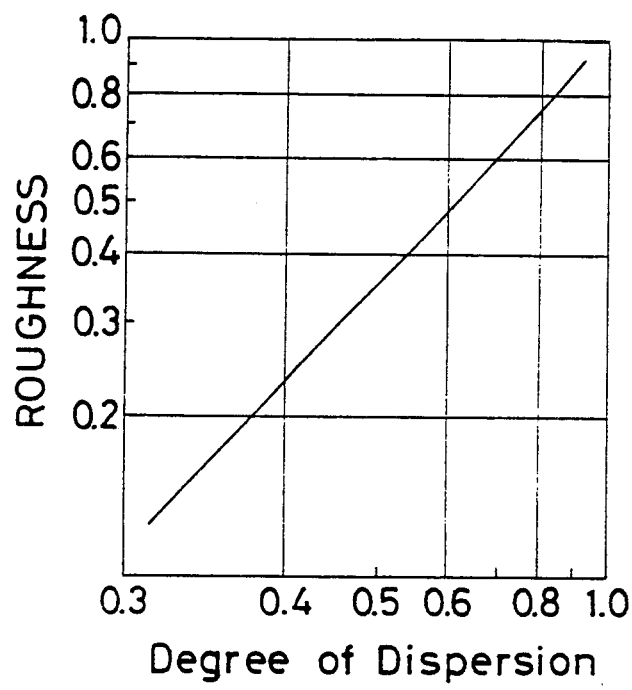
FIG. 1 is a diagram showing the relation between roughness of a frequency modulation sound and dispersibility in a pitch variation method.
Figure 2:
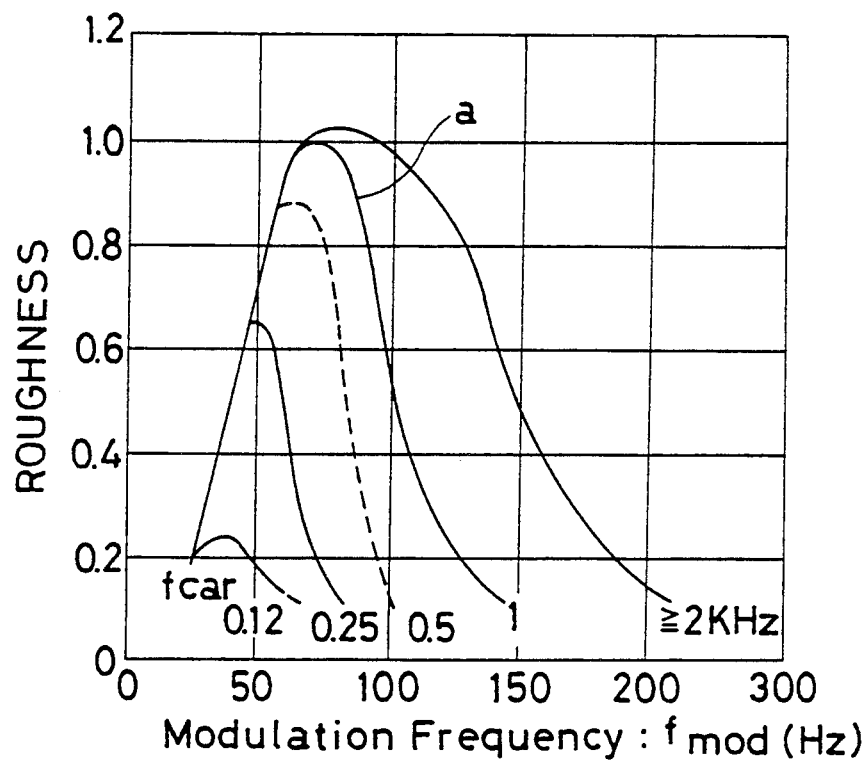
FIG. 2 is a diagram showing the relation between roughness and the modulation frequency and the carrier frequency.
Figure 3:
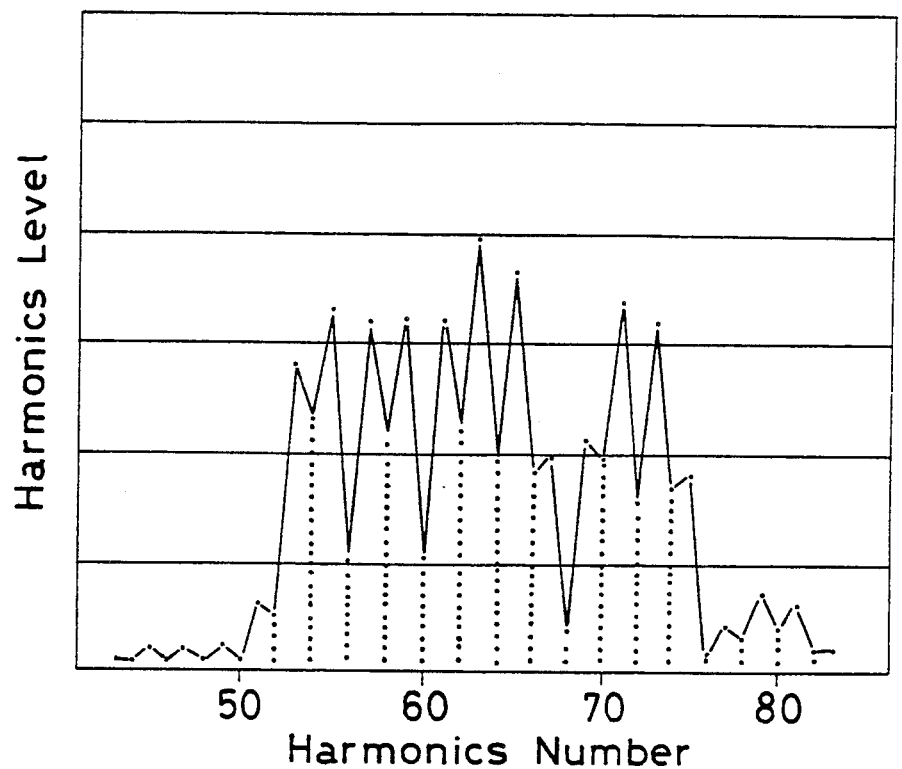
FIGS. 3 and 4 are diagrams showing the relation between a harmonics number and a harmonics level in a tire of an embodiment of the present invention, respectively.
Figure 4:
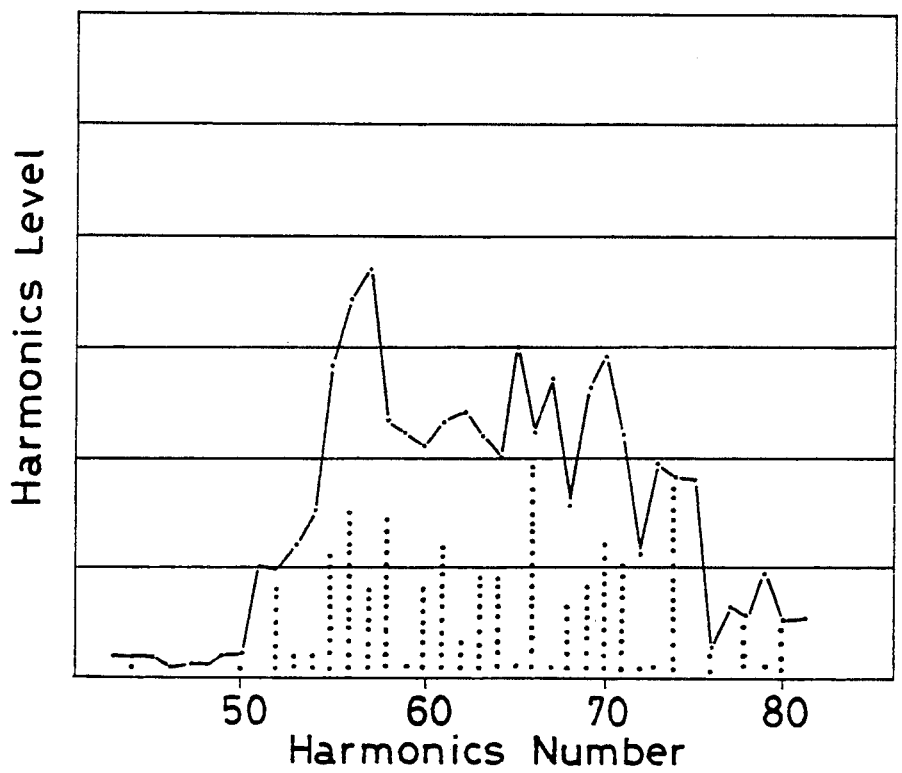

FIG. 1 shows that the greater the dispersibility of the peaks, the greater becomes remarkably roughness when the peaks of the sound pressure level are dispersed by the pitch variation method described already. FIG. 2 shows that when the tires are run while changing the speed, roughness depends on the modulation frequency, that is, the frequency at which pitches having different pitch lengths repeat, and attain the peak at a specific modulation frequency $f_{mod}$. Curve a in FIG. 2, for example, represents that when the tires are run at a speed of 110 km/hr (carrier frequency $f_{car}=1$ KHz), the peak of roughness exists near the modulation frequency $f_{mod}$ of 70 Hz. Conventionally, however, importance has been put only on dispersibility of the peak of the sound pressure level, so that the modulation frequency $f_{mod}$ has been set to a low level of 50 Hz and the peak of roughness has been set to a high value of about 0.75.

In the present invention, four, and preferably 4~5, kinds of pitches having different pitch lengths are disposed inside one circumferential length of the tread and they are disposed in such a manner as to repeat. Among the total number of pitches disposed inside one circumferential length of the tread, the number of the smallest pitches having the smallest pitch length is 1 or 2. If the kinds of pitches having different pitch lengths is 3 or below and if the number of the smallest pitch is 3 or more, it is not possible to provide the tread pattern with the effect of frequency modulation which prevents the occurrence of rustling feel.

Figure 7:
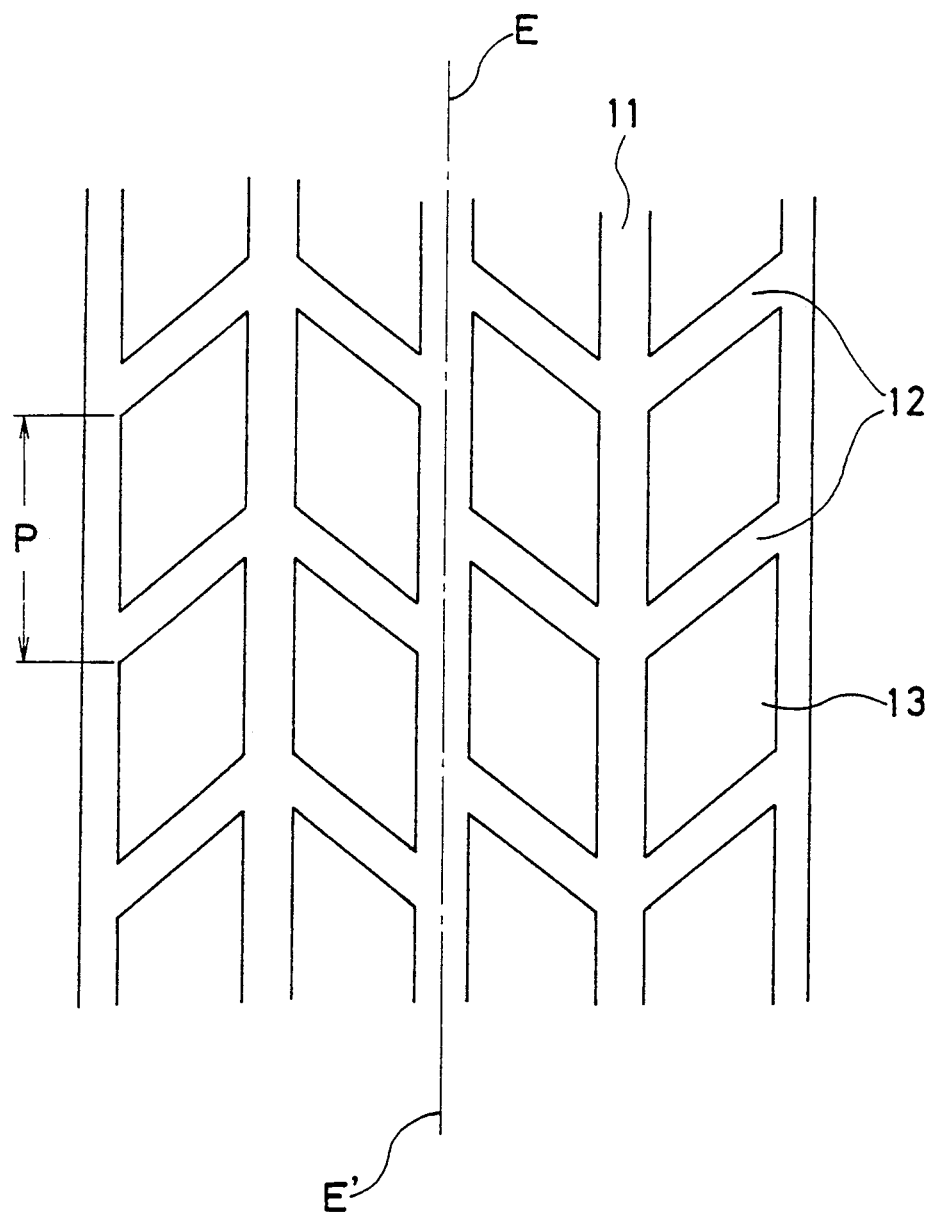
FIG. 7 is a partially enlarged plan view showing an example of the tread pattern on the tread surface of a pneumatic tire.

In a pneumatic tire having a block pattern wherein blocks 13 defined by longitudinal grooves 11 and transverse grooves 12 are arranged in the tire circumferential direction E—E', the pitch P in the tire of the present invention is expressed by the sum of the block 13 and the length of the transverse groove 12 coming into contact with the former in the tire circumferential direction E—E', and corresponds to the minimum element of the tread design, as shown in FIG. 7.

Figure 6:
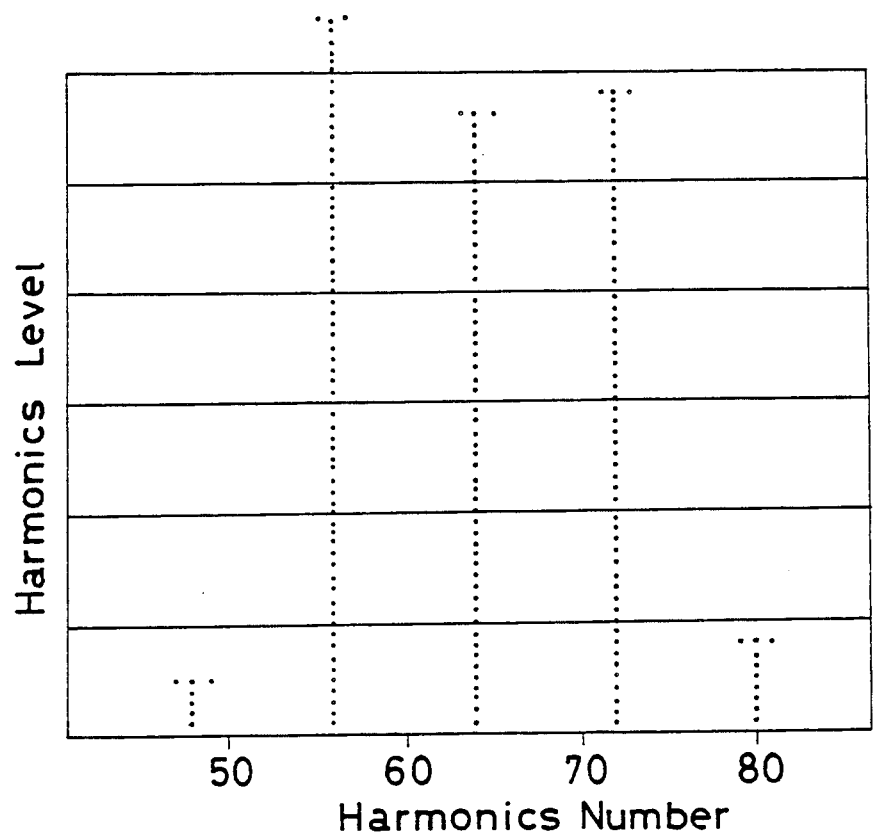

In the pitch arrangement wherein at least four kinds of pitches having different pitch lengths are disposed inside one circumferential length of the tread, the present invention sets the pitch ratio $\alpha$ (Pmax/Pmin) of the greatest pitch length Pmax to the smallest pitch length Pmin to 1.40~1.55. If this pitch ratio $\alpha$ is smaller than 1.40, the effect of frequency modulation which limits rustling feel cannot be obtained and moreover, since the peaks of the harmonics level concentrate too much on the specific harmonics numbers 56, 64, 72, etc., as shown in FIG. 6, dispersibility drops and the pitch noise cannot be reduced. If the pitch ratio is greater than 1.55, on the other hand, the difference between the greatest pitch length Pmax and the smallest pitch length Pmin becomes so great that abnormal wear and abnormal vibration are more likely to occur.

When the fundamental period is defined as a period from a pitch having the greatest pitch length Pmax to a pitch immediately before the next pitch having the greatest pitch length Pmax in the present invention, the total number of the fundamental periods in one circumferential length of the tread is at least 6 and the ratio $\beta$ of the greatest period length Tmax to the smallest period length Tmin (Tmax/Tmin) is from 1.20 to 1.80.

If a plurality of pitches having the same greatest pitch length Pmax continues successively, each pitch having the greatest pitch length Pmax is not counted as the fundamental period, respectively. In other words, the fundamental period is the one that starts from the first pitch having the greatest pitch length Pmax and ends up with a pitch immediately before the pitch having the greatest pitch length Pmax that appears first after passing through the pitch group including a plurality of pitches having the greatest pitch Pmax that are adjacent to the first pitch having the greatest pitch length Pmax and the pitches having other pitch lengths. It will be assumed, for example, that the pitch having the greatest pitch length Pmax is A, the pitch having the smallest pitch length Pmin is D and these two kinds of pitches are arranged in the following sequence:

A A A A A A A D D ,uns/A/ A D D D D A ... ...

Then, the six pitches A next to the first pitch A having the maximum pitch length Pmax to the seventh are not counted as the pitch of the next pitch having the greatest pitch length and the pitch with the underlined A, that is, ,uns/A/ , after the two pitches D having the smallest pitch, is the next first pitch having the greatest pitch length in the next fundamental period. Accordingly, the pitches from the start till the pitch immediately before the pitch ,uns/A/ , that is,

A A A A A A A D D constitute the fundamental period and the subsequent fundamental period consists of:

A A D D D D

If the total number of these fundamental periods is 5 or below, the modulation frequency shown in FIG. 2 enters the range which increases roughness and rustling feel cannot be reduced. Particularly when the total number of the fundamental periods described above is 4 or 5, the modulation frequency exists near the peak at which roughness shown in FIG. 2 becomes maximal. In the case of the curve a, for example, the modulation frequency exists between 50 and 100 Hz and this is not desirable because roughness becomes extremely great. If the period number is below 2, clear distinction cannot be observed in comparison with the case where all the pitches have the same pitch length and the effect of preventing the occurrence of pitch noise cannot be obtained.

Figure 5:
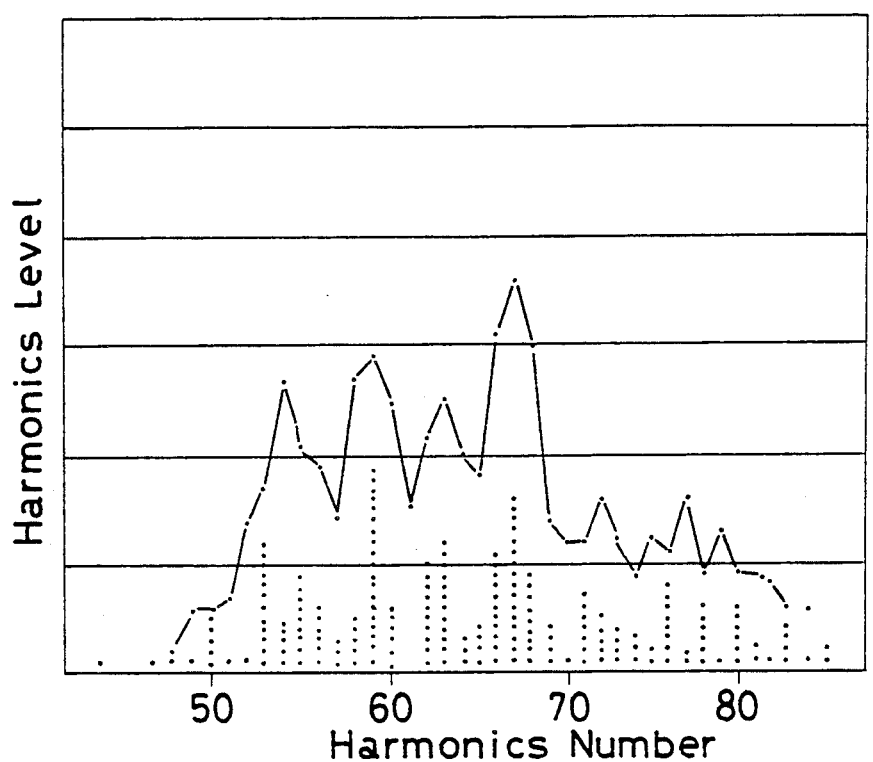
FIGS. 5 and 6 are diagrams showing the relation between the harmonics number and the harmonics level in a comparative tires, respectively.

If this period length ratio b is less than 1.20, the frequency modulation is stressed so excessively that rustling feel which is offensive to ears occurs when the tires are fitted to a vehicle and run actually. If it exceeds 1.80, on the other hand, the peaks of the harmonics level appear throughout almost all the ranges of the harmonics number without any non-uniformity as shown in FIG. 5 and dispersibility is increased too much. Accordingly, roughness cannot be reduced.

As described above, the present invention stipulates the kinds of pitches having different pitch lengths that constitute the tread pattern, the pitch ratio a, the total number of the fundamental periods and the period length ratio 8 so that the peaks of the harmonics level concentrate appropriately on the specific harmonics numbers to reduce dispersibility much more than in the conventional pitch variation method, and minimizes deterioration of the pitch noise and reduce the rustling feel by increasing the modulation frequency to the range where roughness decreases. Moreover, the present invention does not deteriorate the maneuvering stability and the riding comfort.

EMBODIMENTS

Four kinds of tires, i.e., Tires I and II of this invention and Comparative Tires III and IV, were produced. These four kinds of tires had the same size, that is, 195/65 R15.

The pitches on the tread surface of each tire was formed by regrooving linear grooves having a groove width of 4 mm and a groove depth 8 mm at right angles to a tire circumferential direction.

Tire I of this Invention (1) Kind of pitches: 4 kinds
   A =37.6 mm, B =30.8 mm, C =25.2 mm, D =24.4 mm
(2) Pitch ratio $\alpha$: 1.48 (=A/D)
(3) Number of fundamental 8
   First period (242.0 mm): A B B B C C B B
   Second period (223.6 mm): A A B B C B B
   Third period (255.6 mm): A A A B C C B B
   Fourth period (273.2 mm): A A B B C D C B B The arrangement was employed so that the above was repeated twice in the named order.

(4) Total pitch number: 64 (number of minimum pitches D =2)
(5) Period length ratio $\beta$: (First period length/fourth period length) =273.2/223.6 =1.22

Tire II of this Invention (1) Kind of pitches: the same as Tire I of this invention (2) Pitch ratio α: the same as Tire I of this invention
(3) Number of fundamental periods: 8
  first period (317.2 mm): A A A B B B C C B B
  second period (180.4 mm): A B C C B B
  third period (223.6 mm): A A B B C B B
  fourth period (317.2 mm): A A A B B B C C B B
  fifth period (310.8 mm): A A B B C D C B B
  sixth period (180.4 mm): A B C C B B
  seventh period (310.8 mm): A A B B C D C B B
  eighth period (223.6 mm): A A B B C B B
(4) Total pitch numbers: 64 (the same as Tire I of this invention)
(5) Period length ratio δ: (first period length/second period length) = 317.2/180.4 = 1.76

Comparative Tire III (1) Kind of pitches: the same as Tire I of this invention
(2) Pitch ratio α: the same as Tire I of this invention
(3) Number of fundamental periods: 3
  first period (373.2 mm): A A B B B C C C B B B
  second period (621.2 mm): A A A A B B B B B C C D C C B B B B B
  third period (994.4 mm): A A A A A A A B B B B B B B C C C C D C C C B B B B B B B
(4) Total number of pitches: 64 (the same as Tire I of this invention)
(5) Period length ratio β: (third period/first period) = 994.4/373.2 = 2.66

Comparative Tire IV (1) Kind of pitches: the same as Tire I of this invention
(2) Pitch ratio α: the same as Tire I of this invention
(3) Number of fundamental periods: 8
  first period (817.2 mm): A A B B C C B B
  second period (187.2 mm): A A B B C C B B
  third period (187.2 mm): A A B B C C B B
  fourth period (187.4 mm): A A B B C C B B The arrangement was made so that the above repeated twice in order named.

(4) Total number of pitches: 64 (the same as Tire I of this invention)
(5) Period length ratio β: (first period/fourth period = 187.2/186.4 = 1.00

Rustling feel, maneuvering stability and riding comfort were evaluated for the four kinds of tires described above in accordance with the following evaluation method.

EVALUATION METHOD

Tires I and II of this invention and Comparative Tires III and IV were actually fitted to a sedan (of a 2000 cc class) and run on an ordinary flat road. Rustling feel, maneuvering stability and driving comfort at this time were evaluated in accordance with a five-point method by five skilled evaluators so as to obtain the mean values.

The results of measurement were expressed by indices with the values of Comparative Tire III being 100. The greater the numeric values, the better.
The results are tabulated in Table below.

|  | Comp. Tires | | Tires of this Invention | |
| --- | --- | --- | --- | --- |
|  | III | IV | I | II |
| noise (pitch noise) | 100 | 83 | 100 | 105 |
| noise (rustling feel) | 100 | 119 | 115 | 109 |
| maneuvering stability | 100 | 100 | 100 | 100 |
| comfort to drive | 100 | 100 | 100 | 100 |

As is obvious from Table above, the present invention can reduce the pitch noise to the equal or higher level than Comparative Tires without losing the maneuvering stability and the driving comfort and can sufficiently reduce rustling feel.

FIGS. 3 through 6 show the relation between the harmonic level and the harmonic number in the four kinds of tires described above. In Tires I and II of the present invention shown in FIGS. 3 and 4, the peaks of the harmonic level concentrate on specific harmonic numbers and is spread appropriately in the full range of the harmonic numbers. It can also be understood that both the pitch noise and rustling feel are reduced. In contrast, in Comparative Tire III shown in FIG. 5, the peaks of the harmonic level do not concentrate on the specific harmonic numbers but are excessively dispersed, so that the tire can hardly limit the occurrence of rustling feel. In the case of Comparative Tire IV shown in FIG. 6, the peaks exist at only five positions and concentrate only on three positions among them, so that dispersibility is reduced remarkably and the pitch noise becomes remarkable.

What is claimed is:

1. A pneumatic tire having a trend pattern on a thread thereof consisting of a plurality of kinds of pitches having different pitch lengths and arranged repeatedly characterized in that said pitches having different pitch lengths, which are to be disposed inside the length of one circumference of said tread, are at least four kinds, the number of pitches having the smallest pitch length in said one circumference is one or two, and the pitch ratio α of the greatest pitch length Pmax to the smallest pitch length Pmin (Pmax/Pmin) is from 1.40 to 1.55; and that the total number of the fundamental periods, each of which is defined as a period from the pitch having the greatest pitch length to a pitch immediately before the next pitch having the greatest pitch length and which is to be disposed inside one circumference of said tread, is at least 6, and the period length ratio β (Tmax/Tmin) of the greatest period length Tmax to the smallest period length Tmin is from 1.20 to 1.80.

2. The pneumatic tire according to claim 1, wherein the kinds of said pitch having different pitch lengths to be disposed inside one circumference of said tread is from 4 to 5.

* * * * *